United States Patent
Chou et al.

(10) Patent No.: US 10,420,073 B2
(45) Date of Patent: Sep. 17, 2019

(54) SPECTRUM SHARING BASED ON SELF-ORGANIZING NETWORKS

(71) Applicant: Intel IP Corporation, Santa Clara, CA (US)

(72) Inventors: Joey Chou, Scottsdale, AZ (US); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 5 days.

(21) Appl. No.: 15/810,832

(22) Filed: Nov. 13, 2017

(65) Prior Publication Data

US 2018/0098305 A1    Apr. 5, 2018

Related U.S. Application Data

(63) Continuation of application No. 14/766,873, filed as application No. PCT/US2013/075100 on Dec. 13, 2013, now Pat. No. 9,820,260.

(Continued)

(51) Int. Cl.
*H04W 72/00*    (2009.01)
*H04B 7/0456*    (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC . H04W 72/005; H04W 16/114; H04W 16/02; H04W 72/0493; H04W 72/04
See application file for complete search history.

(56) References Cited

U.S. PATENT DOCUMENTS 9,049,588 B2   6/2015   Choi et al.
9,668,252 B2   5/2017   Miklós et al.
(Continued)

FOREIGN PATENT DOCUMENTS

CN    101681472 A    3/2010
CN    102835178 A    12/2012
(Continued)

OTHER PUBLICATIONS

"Chinese Application Serial No. 201380071532.8, Office Action dated Dec. 5, 2017", w/English Translation, 13 pgs.
(Continued)

*Primary Examiner* — Barry W Taylor
(74) *Attorney, Agent, or Firm* — Schwegman Lundberg & Woessner, P.A.

(57) ABSTRACT

Embodiments use the principles of self-organizing networks to allocate resources to allow spectrum owners to share spectrum with wireless carriers according to defined license conditions. A spectrum licensee holds the licensing conditions of the spectrum licensed by the spectrum owners. This licensed spectrum is referred to as secondary spectrum. A self-organizing network server requests access to secondary spectrum. The spectrum licensee grants access to the secondary spectrum along with the licensing conditions for access. The self-organizing network server monitors the conditions associated with the license and/or delegates the responsibility for monitoring conditions associated with the license to others. When the license conditions are met, enhanced Node B systems may begin using the secondary spectrum according to the license conditions. When the license conditions are no longer met, enhanced Node B systems discontinue use of the secondary spectrum.

20 Claims, 8 Drawing Sheets

Related U.S. Application Data

(60) Provisional application No. 61/771,698, filed on Mar. 1, 2013.

(51) Int. Cl.

| | | |
|---|---|---|
| H04B 7/0452 | (2017.01) | |
| H04W 36/14 | (2009.01) | |
| H04W 36/22 | (2009.01) | |
| H04L 5/00 | (2006.01) | |
| H04L 12/741 | (2013.01) | |
| H04B 7/06 | (2006.01) | |
| H04W 24/10 | (2009.01) | |
| H04W 72/04 | (2009.01) | |
| H04W 72/08 | (2009.01) | |
| H04L 29/06 | (2006.01) | |
| H04L 29/08 | (2006.01) | |
| H04W 4/10 | (2009.01) | |
| H04W 12/02 | (2009.01) | |
| H04W 12/04 | (2009.01) | |
| H04W 24/02 | (2009.01) | |
| H04W 24/08 | (2009.01) | |
| H04L 12/18 | (2006.01) | |
| H04W 52/24 | (2009.01) | |
| H04W 72/10 | (2009.01) | |
| H04W 16/14 | (2009.01) | |
| H04W 36/16 | (2009.01) | |
| H04W 36/30 | (2009.01) | |
| H04J 3/12 | (2006.01) | |
| H04W 48/10 | (2009.01) | |
| H04W 48/20 | (2009.01) | |
| H04M 15/00 | (2006.01) | |
| H04L 25/03 | (2006.01) | |
| H04W 76/23 | (2018.01) | |
| H04W 76/14 | (2018.01) | |
| H04W 76/27 | (2018.01) | |
| H04W 76/10 | (2018.01) | |
| H04W 76/20 | (2018.01) | |
| H04W 76/30 | (2018.01) | |
| H04W 4/80 | (2018.01) | |
| H04W 88/06 | (2009.01) | |
| H04W 88/02 | (2009.01) | |
| H04W 88/08 | (2009.01) | |
| H04W 84/18 | (2009.01) | |
| H04W 4/06 | (2009.01) | |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/10* (2018.02); *H04W 76/14* (2018.02); *H04W 76/20* (2018.02); *H04W 76/23* (2018.02); *H04W 76/27* (2018.02); *H04W 76/30* (2018.02); *H04W 4/06* (2013.01); *H04W 4/80* (2018.02); *H04W 84/18* (2013.01); *H04W 88/02* (2013.01); *H04W 88/06* (2013.01); *H04W 88/08* (2013.01); *Y02B 70/32* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/26* (2018.01); *Y02D 70/444* (2018.01)

(56) References Cited

U.S. PATENT DOCUMENTS

| | | |
|---|---|---|
| 9,820,260 B2 | 11/2017 | Chou et al. |
| 9,967,858 B2 | 5/2018 | Bangolae et al. |
| 2011/0038431 A1 | 2/2011 | Frederiksen et al. |
| 2011/0205941 A1 | 8/2011 | Stanforth |
| 2011/0274066 A1 | 11/2011 | Tee et al. |
| 2012/0009963 A1 | 1/2012 | Kim et al. |
| 2012/0051309 A1 | 3/2012 | Kim et al. |
| 2012/0063373 A1 | 3/2012 | Chincholi et al. |
| 2012/0254890 A1 | 10/2012 | Li et al. |
| 2012/0269108 A1 | 10/2012 | Zhai et al. |
| 2012/0276913 A1 | 11/2012 | Lim et al. |
| 2012/0329400 A1 | 12/2012 | Seo et al. |
| 2013/0016639 A1 | 1/2013 | Xu et al. |
| 2013/0017779 A1 | 1/2013 | Song et al. |
| 2013/0080597 A1 | 3/2013 | Liao |
| 2013/0083765 A1 | 4/2013 | Ai |
| 2013/0138817 A1 | 5/2013 | Zhang et al. |
| 2013/0201924 A1 | 8/2013 | Song et al. |
| 2013/0250882 A1 | 9/2013 | Dinan |
| 2013/0272215 A1 | 10/2013 | Khoryaev et al. |
| 2013/0279376 A1 | 10/2013 | Ahmadi |
| 2013/0301609 A1 | 11/2013 | Smith et al. |
| 2013/0308504 A1 | 11/2013 | Nimbalker et al. |
| 2013/0308564 A1 | 11/2013 | Jain et al. |
| 2014/0016614 A1 | 1/2014 | Velev et al. |
| 2014/0044072 A1 | 2/2014 | Piggin |
| 2014/0105134 A1* | 4/2014 | Buddhikot ............ H04W 16/14 370/329 |
| 2014/0119265 A1 | 5/2014 | Shauh et al. |
| 2014/0185575 A1 | 7/2014 | Morioka |
| 2014/0237547 A1* | 8/2014 | Bose .................... H04W 52/367 726/3 |
| 2014/0247766 A1 | 9/2014 | Zhang et al. |
| 2014/0357218 A1* | 12/2014 | Andrianov ............ H04W 16/14 455/406 |
| 2015/0118993 A1 | 4/2015 | Rune et al. |
| 2015/0195831 A1 | 7/2015 | Du et al. |
| 2015/0304853 A1* | 10/2015 | Murray ................. H04W 16/14 455/454 |
| 2015/0373554 A1* | 12/2015 | Freda ................... H04W 16/14 455/450 |
| 2015/0373733 A1 | 12/2015 | Bangolae et al. |
| 2015/0382201 A1 | 12/2015 | Chou et al. |
| 2016/0007319 A1 | 1/2016 | He et al. |

FOREIGN PATENT DOCUMENTS

| | | |
|---|---|---|
| CN | 104956721 A | 9/2015 |
| CN | 105009664 A | 10/2015 |
| CN | 108322914 A | 7/2018 |
| EP | 2509345 A1 | 10/2012 |
| KR | 1020110093581 A | 8/2011 |

(56) References Cited

FOREIGN PATENT DOCUMENTS

| KR | 1020120071229 A | 7/2012 |
|---|---|---|
| WO | WO-2012051303 A1 | 4/2012 |
| WO | WO-2012172155 A1 | 12/2012 |
| WO | WO-2014133641 A1 | 9/2014 |
| WO | WO-2014133651 A1 | 9/2014 |
| WO | WO-2014133652 A1 | 9/2014 |

OTHER PUBLICATIONS

"U.S. Appl. No. 14/766,850, Corrected Notice of Allowance dated Mar. 2, 2018", 3 pgs.
"U.S. Appl. No. 14/766,850, Corrected Notice of Allowance dated Mar. 26, 2018", 3 pgs.
"U.S. Appl. No. 14/766,858, Corrected Notice of Allowance dated May 2, 2018", 2 pgs.
"U.S. Appl. No. 14/766,858, Notice of Allowance dated Mar. 26, 2018", 11 pgs.
"Chinese Application Serial No. 201380071495, Response filed Apr. 16, 2018 to First Search Report dated Nov. 21, 2017", (W/ English Claims), 24 pgs.
"Chinese Application Serial No. 201380071495.0, Office Action dated Aug. 22, 2018", w/o English translation, 6 pgs.
"Chinese Application Serial No. 201380071532.8, Office Action dated Aug. 2, 2018", w/o English Translation, 10 pgs.
"Chinese Application Serial No. 201380071532.8, Response filed Apr. 20, 2018 to Office Action dated Dec. 5, 2017", W/ English Claims, 20 pgs.
"U.S. Appl. No. 14/766,850, Non Final Office Action dated Jul. 24, 2017", 18 pgs.
"U.S. Appl. No. 14/766,850, Notice of Allowance dated Dec. 15, 2017", 12 pgs.
"U.S. Appl. No. 14/766,850, Response filed Oct. 24, 2017 to Non Final Office Action dated Jul. 24, 2017", 11 pgs.
"U.S. Appl. No. 14/766,853, Response filed Mar. 15, 2017 to Non Final Office Action dated Dec. 16, 2016", 12 pgs.
"U.S. Appl. No. 14/766,858, Advisory Action dated Jan. 25, 2018", 3 pgs.
"U.S. Appl. No. 14/766,858, Final Office Action dated Oct. 13, 2017", 19 pgs.
"U.S. Appl. No. 14/766,858, Non Final Office Action dated May 23, 2017", 17 pgs.
"U.S. Appl. No. 14/766,858, Non Final Office Action dated Dec. 16, 2016", 18 pgs.
"U.S. Appl. No. 14/766,858, Preliminary Amendment filed Aug. 10, 2015", 8 pgs.
"U.S. Appl. No. 14/766,858, Response filed Jan. 16, 2018 to Final Office Action dated Oct. 13, 2017", 10 pgs.
"U.S. Appl. No. 14/766,858, Response filed Feb. 13, 2018 to Advisory Action dated Jan. 25, 2018", 10 pgs.
"U.S. Appl. No. 14/766,858, Response filed Aug. 23, 2017 to Non Final Office Action dated May 23, 2017", 13 pgs.
"U.S. Appl. No. 14/766,873, Non Final Office Action dated Jan. 27, 2017", 21 pgs.
"U.S. Appl. No. 14/766,873, Notice of Allowance dated Jul. 11, 2017", 9 pgs.
"U.S. Appl. No. 14/766,873, Response filed to Apr. 27, 2017 to Non Final Office Action dated Jan. 27, 2017", 14 pgs.
"Chinese Application Serial No. 201380071495.0, Office Action dated Nov. 30, 2017", w/ English First Search Report and Claims, 16 pgs.
"Chinese Application Serial No. 201380071532.8, Voluntary Amendment filed Feb. 5, 2016", w/English Claims ,18 pgs.
"European Application Serial No. 13876599.5, Extended European Search Report dated Sep. 23, 2016", 9 pgs.
"European Application Serial No. 13876599.5, Response Filed Apr. 19, 2017 to Extended European Search Report dated Sep. 23, 2016", 14 pgs.
"International Application Serial No. PCT/US2013/075100, International Preliminary Report on Patentability dated Sep. 11, 2015", 7 pgs.
"International Application Serial No. PCT/US2013/075100, International Search Report dated May 19, 2014", 3 pgs.
"International Application Serial No. PCT/US2013/075100, Written Opinion dated May 19, 2014", 5 pgs.
"International Application Serial No. PCT/US2013/075633, International Preliminary Report on Patentability dated Sep. 11, 2015", 10 pgs.
"International Application Serial No. PCT/US2013/075633, International Search Report dated Apr. 10, 2014", 3 pgs.
"International Application Serial No. PCT/US2013/075633, Written Opinion dated Apr. 10, 2014", 8 pgs.
"International Application Serial No. PCT/US2013/075768, International Preliminary Report on Patentability dated Sep. 11, 2015", 8 pgs.
"International Application Serial No. PCT/US2013/075768, International Search Report dated Apr. 18, 2014", 3 pgs.
"International Application Serial No. PCT/US2013/075768, Written Opinion dated Apr. 18, 2014", 6 pgs.
"MBMS Service continuity for UE configured with CA", LG Electronics Inc; 3GPP Draft; R2-123458 MBMS Service Continuity for CA UE, 3rd Generation Partnership Project (3GPP), Mobile Competence Centre; 650, Route Des Lucioles; F-06921 Sophia-Antipolis Cedex; France, vol. RAN WG2, No. Qingdao, China, [Online] Retrieved from the Internet:<URL:http://www.3gpp.org/ftp/tsg_ran/WG2_RL2/TSGR2_79/Docs/> [retrieved on Aug. 7, 2012], (Aug. 7, 2012).
"On New Carrier Type", Ericsson; 3GPP Draft; R1-130546, 3rd Generation Partnership Project (3GPP), Mobile Competence Centre; 650, Route Des Lucioles; F-06921 Sophia-Antipolis Cedex ; France, vol. RAN WG1, No. St. Julian, [Online] Retrieved from the Internet:<URL:http://www.3gpp.org/ftp/tsg_ran/WG1_RL1/TSGR1_72/Docs/>, (Jan. 19, 2013).
"Resource Allocation Methods for NCT", R1-122876, 3GPP TSG-RAN WG1 #69, Prague, CZ, (May 21, 2012).
"Resource Allocation Methods for NCT", Qualcomm Incorporated, [Online]. Retrieved from Internet:<http://www.3gpp.org/DynaReport/TDocExMtg--R1-71--29005.htm>, (Nov. 2012), 2 pgs.
U.S. Appl. No. 14/766,873 U.S. Pat. No. 9,820,260, filed Aug. 10, 2015, Spectrum Sharing Based on Self-Organizing Networks.
U.S. Appl. No. 14/766,858, filed Aug. 10, 2015, Method and Apparatus for Multimedia Broadcast Multicast Service (MBMS) Control Information Delivery.
U.S. Appl. No. 14/766,850, filed Aug. 10, 2015, Method and Apparatus for Configurtng and Using Small Data Radio Bearers.

* cited by examiner

SPECTRUM SHARING BASED ON SELF-ORGANIZING NETWORKS

PRIORITY CLAIM

This application is a continuation of U.S. application Ser. No. 14/766,873, filed Aug. 10, 2015, now issued as U.S. Pat. No. 9,820,260, which is a U.S. National Stage Filing under 35 U.S.C. 371 from International Application No. PCT/US2013/075100, filed Dec. 13, 2013, now published as WO 2014/133641, which claims the benefit of priority to U.S. Provisional Patent Application Ser. No. 61/771,698, filed on Mar. 1, 2013, all of which are incorporated herein by reference in their entirety.

TECHNICAL FIELD

Embodiments pertain to wireless communications. More particularly, some embodiments relate to spectrum sharing between wireless devices.

BACKGROUND

Global mobile traffic is growing at an ever-expanding pace. As the demand for wireless capacity increases, numerous technologies are being explored to increase a carrier's capacity. In many countries, there are underutilized portions of the wireless spectrum that are devoted to other purposes. Wireless carriers are looking for ways to share spectrum allocated for other uses.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order to not obscure the description of the embodiments with extraneous detail. Thus, the present disclosure is not intended to be limited to the embodiments shown, but is to be accorded the widest scope consistent with the principles and features disclosed herein.

Often owners of wireless spectrum do not fully utilize the spectrum which they are allocated. In many countries, measurements have shown that there is a huge amount of underutilized spectrum in the 400 MHz to 6 GHz range. By comparison, commercial mobile broadband carriers typically hold licenses for less than 20% of the spectrum in the 400 MHz to 6 GHz range and utilize their spectrum to its full capacity. One mechanism for wireless carriers to share wireless spectrum with others who underutilize their spectrum is to come to agreements with the other spectrum licensees to utilize their spectrum under certain, defined conditions. The description below uses the concepts of self-organizing networks (SON) to provide dynamic spectrum sharing.

SON is a function that enables networks to organize their own network resources in an automatic and effective manner in order to increase overall network performance, operation efficiency, coverage, capacity, reliability and so forth. The embodiments described below apply SON to organize network spectrum in order to improve network performance and user experiences.

Figure 1:
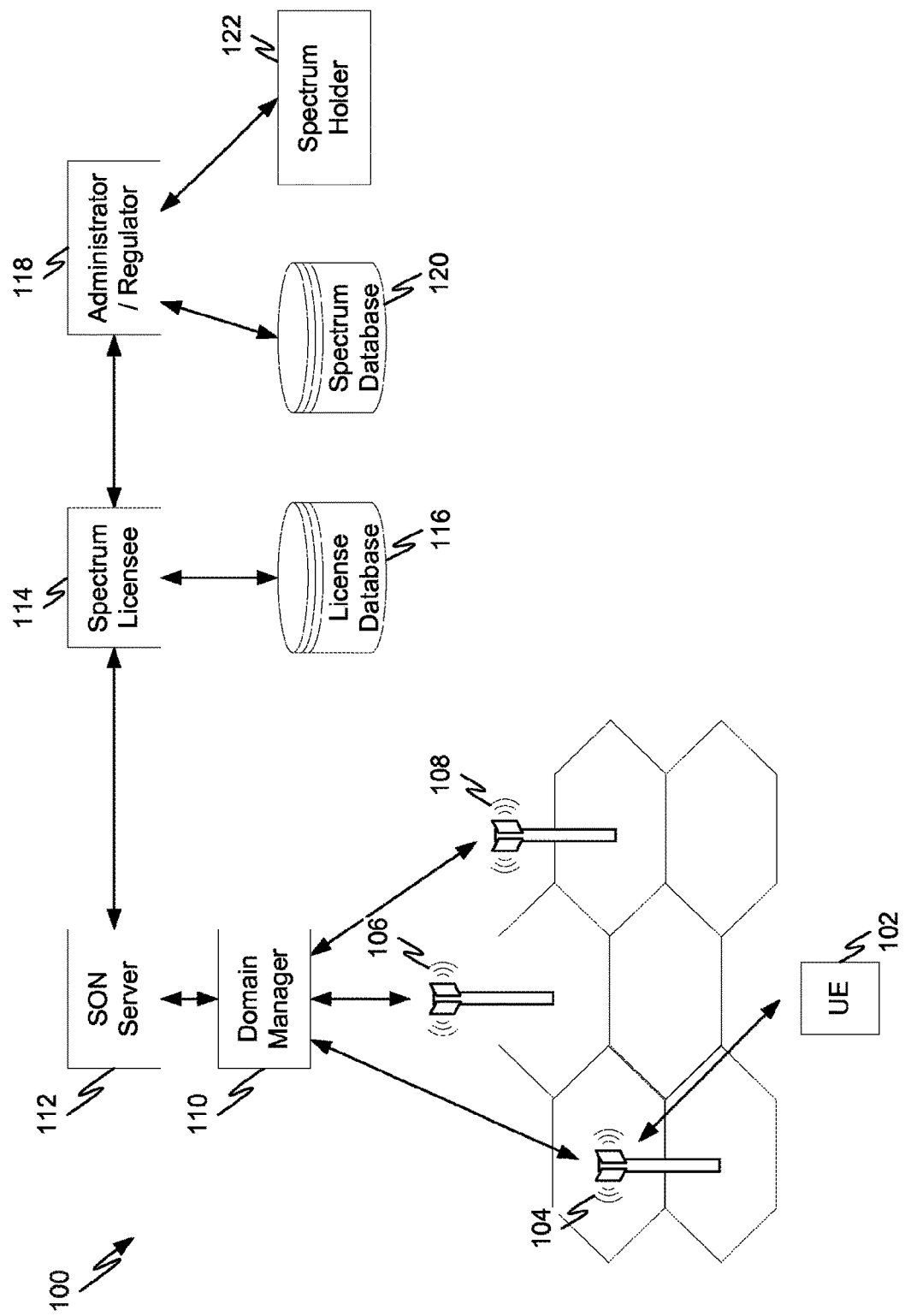
FIG. 1 illustrates an example architecture for spectrum sharing based on self-organizing networks.

FIG. 1 illustrates an example architecture 100 for spectrum sharing based on self-organizing networks. The example architecture comprises enhanced Node B (eNB) 104, 106, 108 that communicate with User Equipment (UE), such as UE 102. eNBs 104-108 may be coordinated and/or controlled by an entity such as domain manager 110. Domain manager 110 typically provides element manager (EM) functions for a sub-network. Inter-working domain managers provide multi-vendor and multi-technology network management functions.

Administrator/regulator 118 may negotiate with the spectrum holder 122 to make spectrum available under certain conditions or agree on rules for spectrum sharing. The spectrum that is made available and the conditions under which it is made available may be saved in a store, such as spectrum database 120. A database in the context of this disclosure is any store where the desired information may be stored and later retrieved by the relevant entities.

Spectrum licensee 114, which is typically a mobile broadband carrier, cellular operator, or other such entity may negotiate with the administrator/regulator 118 to acquire licenses for the spectrum that is being shared. Such licenses and the terms of the license may be stored in a data store such as license database 116. Each license may contain the spectrum and the terms under which the spectrum may be shared. An example license may include, but is not limited to, one or more of the following information:

(1) The frequency and bandwidth of the spectrum to which the license applies. This may be specified in any desired format as long as the system will be able to determine what frequency band may be used. In this disclosure, the spectrum subject to sharing is referred to as the secondary spectrum.

(2) The sharing type, such as exclusive access, non-exclusive access, access when the spectrum owner is not present, and so forth.

(3) A geographic location or region where the spectrum is available for use. This may be specified in a variety of ways/formats as long as the licensee is able to determine where the spectrum may be used. This may also include location and/or regions where the spectrum may not be used.

(4) The conditions under which the spectrum may be used. Such conditions may include one or more of the following representative conditions:
  (a) a time at which the secondary band may be used;
  (b) a time at which the secondary band may not be used;
  (c) at least one event that indicates the secondary band may be used;
  (d) at least one event that indicates the secondary band may not be used;
  (e) a demand threshold above which the secondary band may be used;
  (f) a demand threshold below which the secondary band may not be used;
  (g) action(s) to be taken upon detecting presence of the spectrum owner or other designated entity;
  (h) action(s) to be taken upon detecting absence of the spectrum owner or other designated entity; and
  (i) combinations thereof.

In the above, while geographic location and sharing type have been called out separately, these can be represented as part of the conditions of the license, and they are generally treated as such in this disclosure. Thus, for simplicity in this disclosure, geographic location and/or sharing type are another of the conditions that are (optionally) made part of the license.

The conditions of the license may be put together in any combination of "and"/"or" logic. For example, a license may authorize the use of the secondary band in a particular geographic region when (the time is between X and Y) or (the demand is greater than a threshold and the spectrum owner is not present). This "and"/"or" logic combination of elements is illustrated in the above list by the phrase "combinations thereof".

Conditions of the license may be specified in a variety of ways. For example, the time that a band may be used may be specified as a start time coupled with a stop time, a start time along with a duration, and so forth. All that is needed is for the licensee and the systems under its control to be able to determine the conditions under which the license is granted so they can comply with them.

To illustrate how a license may be formulated, the following examples are presented. Note that these are examples only and are not limiting in the way the license may be implemented. In a first example, suppose that daily traffic patterns threaten to overwhelm a carrier's ability to provide service to its customers. Secondary spectrum may be made available to the carrier during peak traffic times, such as from 4:00 pm to 7:00 pm on weekdays. The terms of the secondary spectrum may be further limited to the geographic region surrounding the major commuting corridors in the city. The terms of the secondary spectrum may be further limited by the condition that if the original spectrum licensee 114 is present, the geographic region where the original spectrum licensee 114 is present will implement a collision avoidance or back off procedure. Since the traffic patterns are reasonably predictable, prediction logic may be used to identify the most likely days/times when the secondary spectrum may be needed.

In a second example, airport traffic patterns may be somewhat cyclic, with several flights flowing into an airport, followed by flights leaving the airport. Thus the number of people in the airport utilizing spectrum bandwidth may follow such cycles. License terms may be crafted that allow carriers to use the secondary spectrum when the peaks of this ebb and flow exceed a certain capacity (e.g., demand exceeds a certain threshold). As in the first example, other terms may be added as appropriate to limit use by time, day, original spectrum owner presence, and so forth.

In a third example, certain events may cause an increased demand for wireless capacity. In many instances, such events are known in advance and may be planned for in terms of license terms. For example, carriers in a city hosting a large sporting event may anticipate increased demand in particular geographic regions on the day of the event. These geographic regions may change over time as fans arrive, watch and then leave the event. Other cities see increased demand based on seasonal, holiday, or other such events. These may usually be anticipated in advance and license crafted appropriately.

In a forth example, additional spectrum may be needed due to unanticipated or unplanned occurrences, such as natural disasters, civil unrest, and so forth. License terms may also take into account the nature of the event as well as the occurrence of the event. Thus, a license for an anticipated sporting event may specify demand above a certain threshold as well as the absence of the secondary spectrum owner, while a license for a declared emergency may allow a carrier to utilize the secondary bandwidth independent of all but the most important criteria.

Returning to FIG. 1, the SON logic may be implemented in a more centralized fashion, a more distributed fashion, or some combination thereof. The SON server 112 may be part of these implementations. In the more centralized implementations, The SON server 112 may determine when the secondary spectrum is needed, when the conditions of the license are met, and so forth and may perform any actions needed to inform the spectrum licensee 114 that they intend to make use of the secondary spectrum, or to obtain permission from the spectrum licensee 114 to make use of the secondary spectrum. The spectrum licensee 114 may then make the secondary spectrum available based on the conditions of the license, if permission is needed/requested and/or may note the SON server 112 that is making use of the secondary spectrum, if desired. Note that in this exchange the SON Server 112 may be aware of the conditions of the license and use one or more of the conditions to make the determination that the secondary spectrum is needed or may have separate criteria under which it makes the determination and asks for, or makes use of, the licensed spectrum.

Once the SON server 112 has performed any needed exchanges with the spectrum licensee 114, the SON server 112 may initiate use of the secondary spectrum. In some example embodiments, this may occur by the SON server 112 requesting the domain manager 110 to turn on the secondary spectrum. In other embodiments, SON server 112 may communicate directly with eNBs 104-108 and request they begin using the secondary spectrum.

In the more distributed implementations, the SON server 112 may delegate some or all of these functions to domain manager 110 or eNBs, such as eNB 104, 106, and/or 108. For example, eNBs 104-108 may be able to identify when the conditions of the license are met and communicate with the SON server 112 and/or the spectrum licensee 114 to begin using the secondary spectrum in accordance with the conditions of the license.

Once the spectrum is utilized, the SON server 112, domain manager 110, and/or eNB 104, 106, 108, may watch to determine when the conditions of the license are no longer met. For example, the time during which the secondary spectrum may be used may have expired, the event may no longer be occurring, and so forth. When the conditions of the license are no longer met, the various systems take steps to terminate use of the secondary spectrum. How this is done will depend on whether the embodiment is a more centralized implementation, a more distributed implementation, or a combination thereof.

Figure 2:
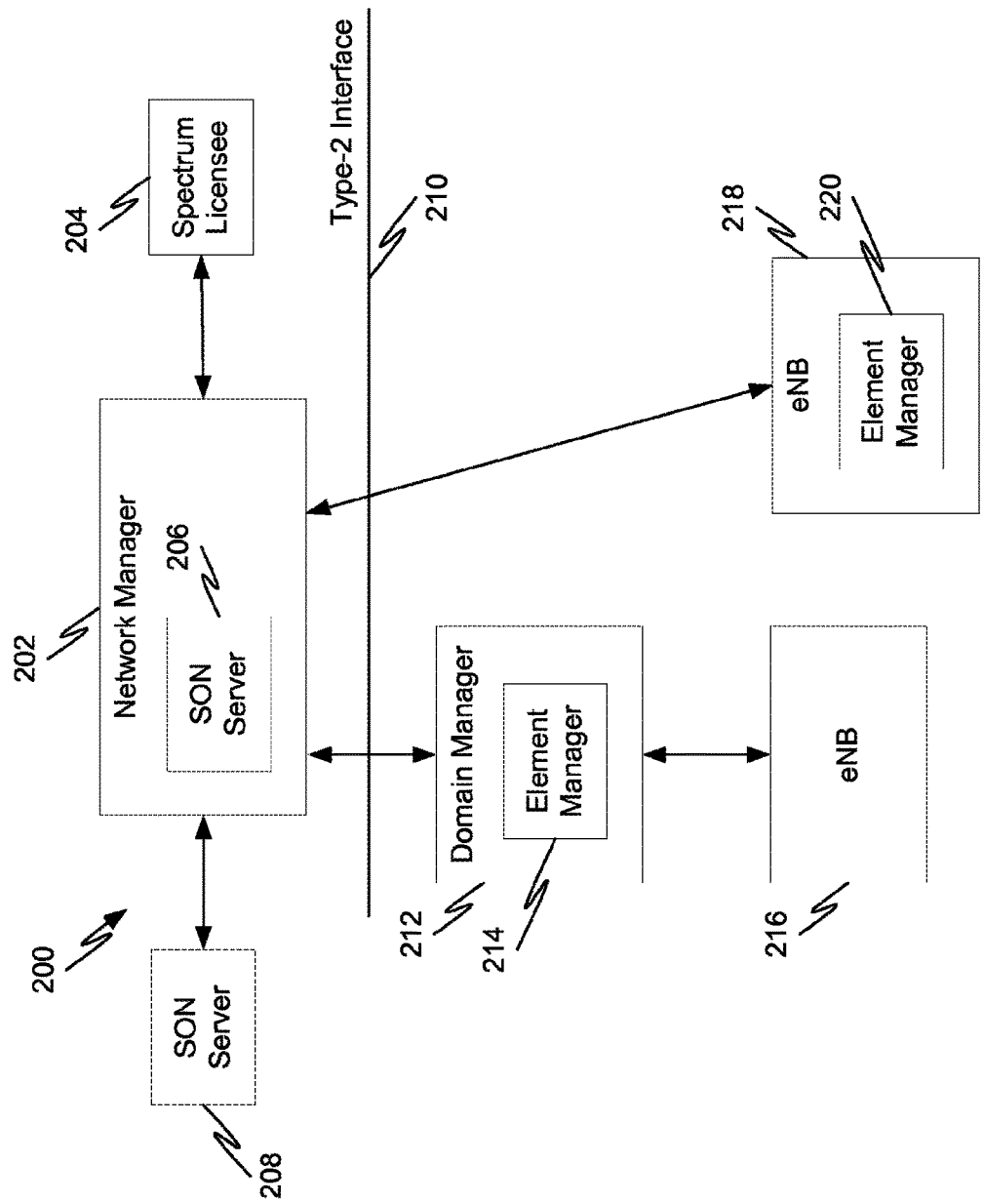
FIG. 2 illustrates an alternate example architecture for spectrum sharing based on self-organizing networks.

FIG. 2 illustrates an alternate example architecture 200 for spectrum sharing based on self-organizing networks. More specifically, FIG. 2 illustrates variations of how an SON server may be implemented in some embodiments. The architecture 200 of FIG. 2 illustrates that SON server 206 may be implemented as part of an existing system, such as the network manager 202. In this variation, network manager 202 may communicate with spectrum licensee 204. The architecture 200 of FIG. 2 focuses on how the SON server may be implemented so other entities such as an administrator/regulator, spectrum holder, spectrum database, license database, and so forth are not illustrated, although they may be related and connected as illustrated in FIG. 1.

Rather than having the SON server implemented as part of the network manager 202 as shown by the SON server 206, the SON server may be implemented separately (or on a separate system) and be put in communication with the network manager 202. In such an embodiment, the SON server 206 would be removed and the SON server 208 would be used instead. In either case, an SON server is utilized in the architecture.

When the SON server is part of the network manager 202, the SON server 206 may communicate directly to various entities such as the spectrum licensee 204, the domain manager 212, and/or the eNB 218. When the SON server is separate from the network manager 202 (e.g., SON server 208), then the SON server 208 may communicate with the spectrum licensee 204, the domain manager 212 and/or the eNB 218 via the network manager 202.

The network manager 202 may be connected through a type-2 interface 210 to one or more domain managers 212 and/or one or more eNBs 218. The domain manager 212 may provide element manager (EM) 214 functions for a sub-network (illustrated in FIG. 2 by the eNB 216). Interworking domain managers provide multi-vendor and multi-technology network management functions. In situations where the network manager 202 is connected directly to a sub-network of one or more eNB 218, the eNB 218 may comprise element manager 220 as illustrated. Similarly, when the SON server is part of the network manager 202 (e.g., the SON server 206), the SON server/network manager interface does not necessarily exist physically, so operators wishing to know the status (e.g., activation/deactivation, license conditions, and so forth) of the secondary spectrum may query the network manager 202 directly.

Figure 3:
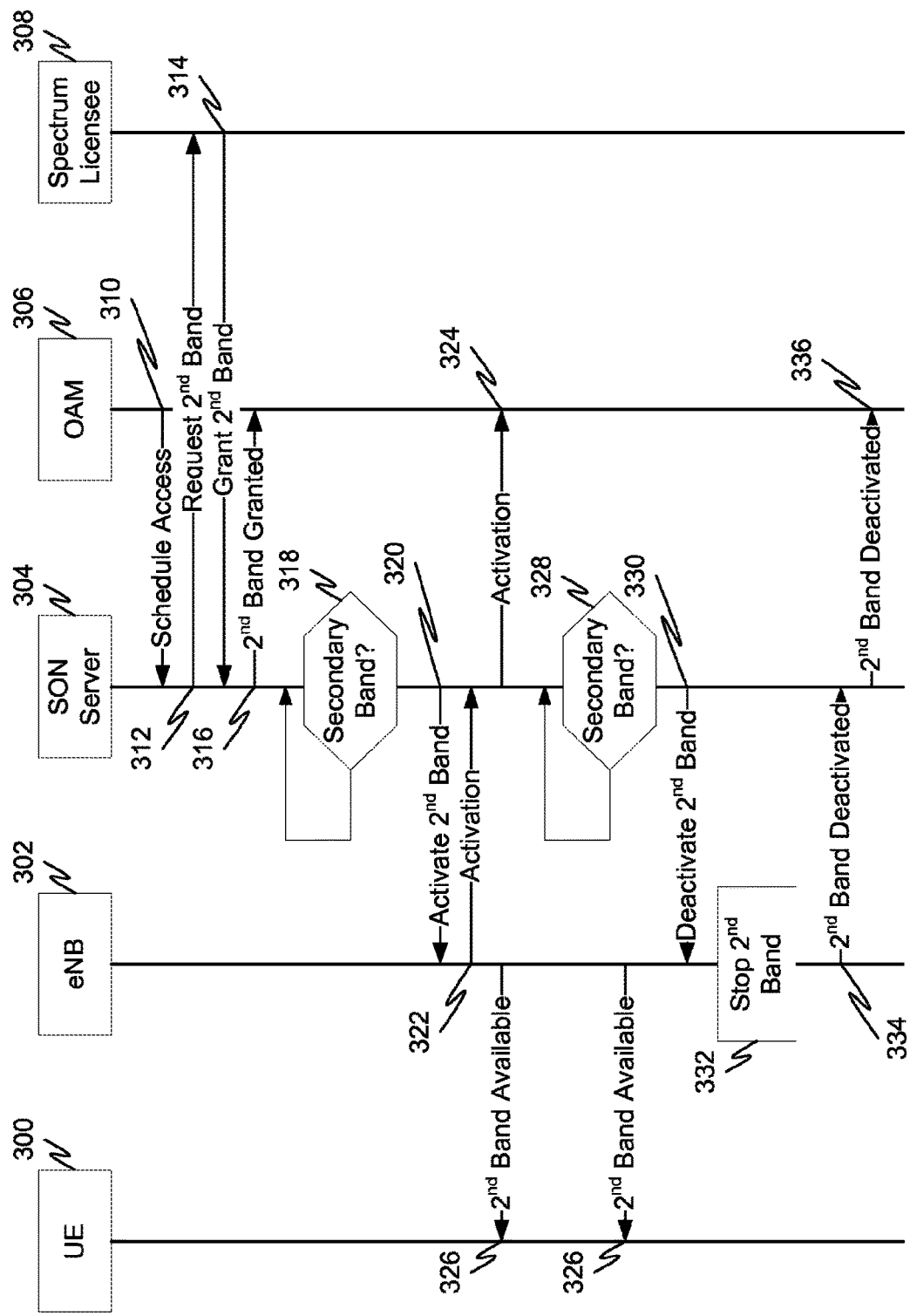
FIG. 3 illustrates an example diagram for spectrum sharing based on a centralized self-organizing network.

FIG. 3 illustrates an example diagram for spectrum sharing based on a centralized self-organizing network. In this embodiment, no domain controller is illustrated, although one may be utilized and some of the functionality may be implemented thereby.

The method begins with the Operations and Management Server (OAM) 306 scheduling access/use of the secondary spectrum as indicated by exchange 310 between the OAM 306 and the SON server 304. This is to indicate that the OAM 306 gets the schedule from the operator and then forwards the information to the SON server 304. As discussed in conjunction with FIG. 2 above, depending on how the SON server 304 is implemented, the interface between OAM 306 and the SON server 304 may not physically exist. This exchange may inform the SON server 304 of the conditions under which the SON server 304 should use/ request access to the secondary spectrum. Additionally, or alternatively, this exchange may inform the SON server 304 which spectrum licensee 308 to deal with when using the secondary spectrum, if there are multiple such spectrum licensees 308. In a representative embodiment, the OAM 306 may use forecasting or other predictive mechanisms to predict when and under what conditions secondary spectrum may be needed. The OAM 306 may then inform or pre-provision the SON server 304 of these planned needs. The SON server 304 may then use those predictions to obtain permission to use the secondary spectrum in a manner that satisfies the planned needs.

Exchange 312 and exchange 314 between the SON server 304 and the spectrum licensee 308 may be any exchanges to allow SON server 304 to gain access to the secondary spectrum. For example, the secondary spectrum may not be exclusively owned by one operator. Indeed, the secondary spectrum may be shared by multiple operators. These exchanges may check with the spectrum licensee (or licensees) to ensure that the requested secondary spectrum is not being used at the time of the request. In one embodiment, the SON server 304 may request access to secondary spectrum in a manner that meets forecasted needs as described above. Thus exchange 312 may request access to the secondary spectrum that meets particular criteria such as time, place, event, and/or other criteria as appropriate. The spectrum licensee 308 may consult its licensed spectrum as well as any previously granted use of the secondary spectrum and the conditions under which the spectrum is licensed and return to the SON server 304 a secondary spectrum along with the terms of the license that should be adhered to in order to use the spectrum.

For example, in anticipation of a large political rally, the SON server 304 may request access to secondary spectrum having a particular capacity for a particular geographic region during a particular time frame. The spectrum licensee 308 may locate two suitable secondary spectrum, along with the conditions for use of each. Perhaps the first meets the geographic and time specifications but imposes an additional restriction that the spectrum may only be used if demand exceeds a certain threshold. Perhaps the second also meets the geographic and time specifications but imposes the additional restriction that the spectrum may only be used if the original spectrum owner is not present. The spectrum licensee 308 may select one, either based on selection rules (e.g., preference rules that indicate which additional restrictions should be selected for a particular requestor) or using some other criteria and indicate the granted spectrum, along with the full terms of the license in exchange 314. Alternatively, the spectrum licensee 308 may inform the SON server 304 of the additional restrictions and the SON server 304 may select which spectrum is more suited for its needs.

When requesting secondary spectrum, the SON server 204 may be as specific as needed, but too may requirements may cause the spectrum licensee 208 to fail to find a suitable match. Failure to find a match may be communicated to the SON server 204 in exchange 214 if needed.

Once SON server 204 has received the requested spectrum, it may notify the OAM 206 of the grant in exchange 216. Alternatively, if no suitable secondary spectrum is available, that may be conveyed to the OAM 206 in exchange 216.

In some embodiments, the spectrum may be granted on an ongoing basis (e.g., until revoked by the spectrum licensee 308) without the need to renegotiate every time an anticipated need arises. For example, if it is forecasted that demand will exceed a certain threshold every weekday that is not a holiday at certain times in certain locations, a single request may be sufficient to receive a grant for such times and locations without having to request secondary spectrum each day. The grant may continue until revoked. In such embodiments, the OAM 306 may simply adjust the requests as needed to account for any changes, such as the secondary spectrum is no longer needed for the requested times and locations due to some set of changes in circumstances such as additional capacity coming online through some other technology. Additionally, or alternatively, the spectrum licensee 308 may take affirmative steps to pull back grants or to confirm needs on a periodic basis or on occurrence of events such as a request for secondary spectrum that has previously been granted to another.

In the more centralized implementation of FIG. 3, once the conditions under which the secondary spectrum was grated are met, the secondary band may be activated. The secondary band decision block 318 illustrates a "wait state" that prevents the secondary band from being accessed until the conditions of the license are met. As previously discussed, this may be any number of conditions such as time, event occurrence, and so forth.

When the conditions allowing use of the secondary band are met, the SON server 304 informs one or more appropriate eNB 302 to begin using the secondary band as indicated by exchange 320. This may be accomplished by the SON server 304 communicating directly with the eNBs 302 or may be accomplished by the SON server 304 initiating use of the secondary band by the eNBs 302 through one or more intermediary systems.

The eNB 302 may initiate exchange 322 to indicate back to the SON server 304 that use of the secondary band has been activated. The SON server 304 may, in turn, inform the OAM 306 that use of the secondary band has been activated as indicated by exchange 324.

Once the secondary band has been activated, eNB 302 may periodically broadcast on the primary band the availability of the secondary band as indicated by exchange 326. UE 300 may receive the exchange 326 and begin using the secondary band for communication. Note that use of the secondary band will often be in addition to, rather than as an alternative to, the primary band. In such situations, the UE 300 may support carrier aggregation so both bands may be used simultaneously. Additionally, the UE 300 may be connected to the eNB 302 using the primary band and may use the secondary band on an "as needed" basis. In this situation, the eNB 302 may control the UE 300 mainly via the primary band. Thus, UE 300 may support cognitive radio and/or software defined radio technology in order to be able to tune to any band that is granted from the spectrum licensee as appropriate.

While the secondary band is being used, the SON server 304 may monitor the conditions of the license to identify when the conditions are no longer met. What needs to be monitored and identification of the appropriate data depends on the license. Using some of the example license conditions above, suppose the carrier is allowed to use the secondary band during a set time period on weekdays when the demand is greater than a certain level. In this situation, the SON server 304 would monitor the time as well as the demand level and cease use of the secondary band if the time has expired or if the demand drops below the agreed upon level. When the time has expired or the demand has dropped, the SON server 304 may initiate the process that discontinues use of the secondary band.

In FIG. 3, secondary band decision block 328 indicates the SON server 304 monitoring the conditions of the license. When the conditions are no longer met, then the SON server 304 initiates the process that discontinues use of the secondary band as indicated by exchange 330.

The eNB 302 receives notice that use of the secondary band should be discontinued and stops using the band as indicated by operation 332. Discontinuing use of the secondary band may involve migrating any UE 300 using the secondary band from the secondary back to the primary band. Discontinuing use of the secondary band may also involve ceasing to broadcast the availability of the secondary band.

Once the eNB 302 has discontinued use of the secondary band and any steps taken that are needed to stop all use of the band, the eNB 302 may initiate exchange 334 to inform SON server 304 that use of the secondary band has been discontinued. Once all the eNB 302 that had been using the secondary band have stopped, the SON server 304 may initiate exchange 336 to let the OAM 306 know that use of the secondary band has been discontinued. Alternatively, if multiple eNB 302 are using the secondary band, the SON server 304 may let the OAM 306 know as soon as a particular eNB 302 stops using the secondary band.

Figure 4:
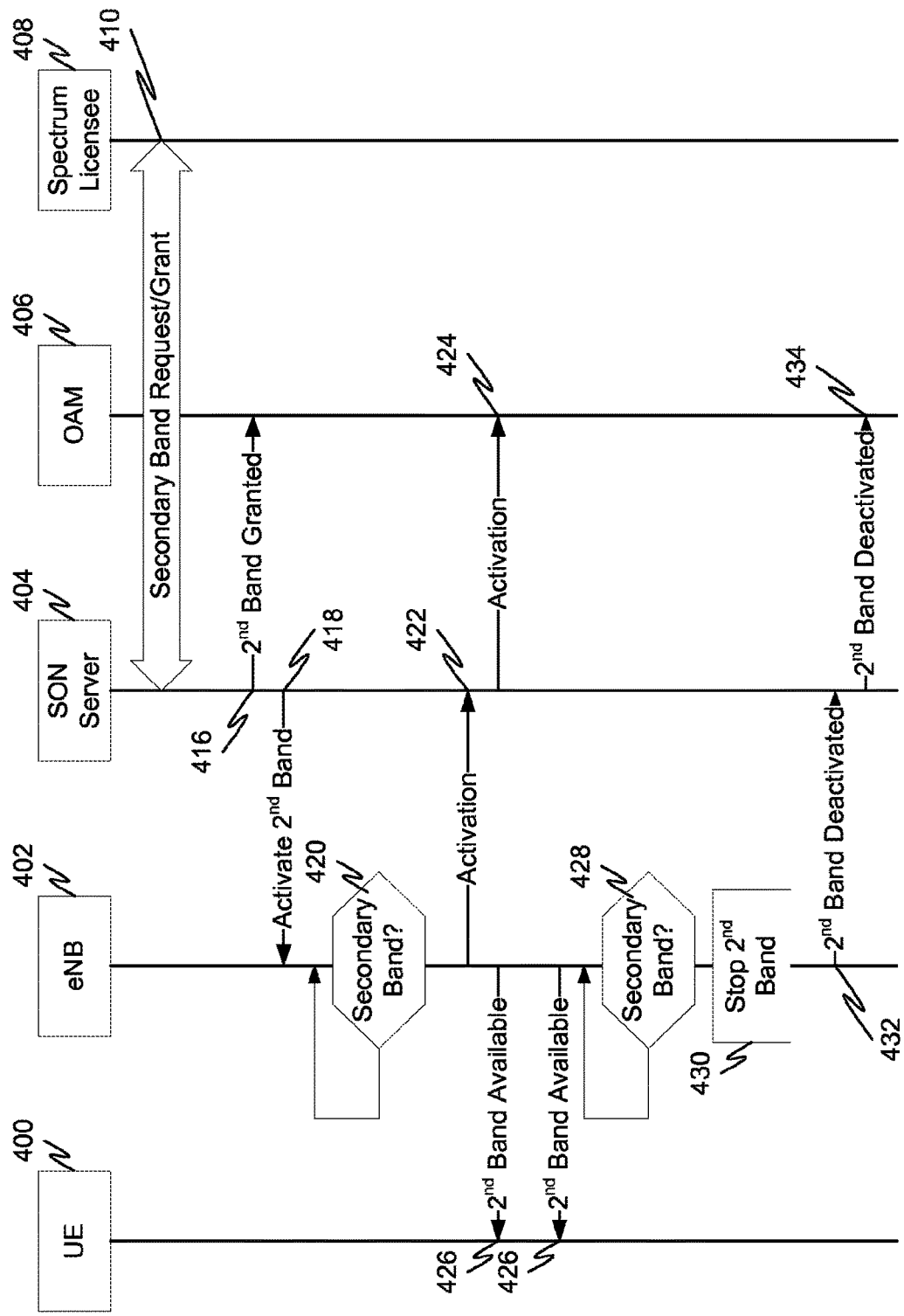
FIG. 4 illustrates an example diagram for spectrum sharing based on a distributed self-organizing network.

FIG. 3 illustrates a more centralized embodiment where the functionality of the self-organizing network is performed primarily by SON server 304. Functions performed by the SON server 304, however, may be performed in a more decentralized or distributed manner rather than the centralized manner illustrated in FIG. 3. FIG. 4 illustrates an example diagram for spectrum sharing based on a distributed self-organizing network.

As described in conjunction with the centralized model of FIG. 3, the Operations and Management Server (OAM) 406 may initiate scheduling access/use of the secondary spectrum by informing the SON server 404 of the conditions under which the SON server 404 should use/request access to the secondary spectrum. The OAM 406 may also inform the SON server 404 which spectrum licensee to deal with when using the secondary spectrum, if there are multiple such spectrum licensees. As discussed in conjunction with FIG. 3 above, depending on how the SON server 404 is implemented, the interface between OAM 406 and the SON server 404 may not physically exist.

As in the embodiment of FIG. 3, the OAM 406 may use forecasting or other predictive mechanisms to predict when and under what conditions secondary spectrum may be needed. The OAM 406 may then inform the SON server 404 of these planned needs. The SON server 404 may then use those predictions to obtain permission to use the secondary spectrum in a manner that satisfies the planned needs. Thus, the SON server 404 may request access to the secondary spectrum from the spectrum licensee 408 and any associated requirements (e.g., time, place, event, and/or other criteria as appropriate). The spectrum licensee 408 may consult its licensed spectrum and the conditions under which the spectrum is licensed and return to the SON server 404 a secondary spectrum along with the terms of the license that should be adhered to in order to use the spectrum.

Exchanges between the OAM 406, the SON server 404 and the spectrum licensee 408 to identify the need for the secondary band and to request/receive access to the secondary band, including the provisions under which access is granted, are indicated by secondary band request/grant process 410.

In the distributed architecture of FIG. 4, the SON server 404 may delegate to or work with other systems to ensure that access to the secondary band is granted in accordance with the conditions of the license. Thus, the SON server 404 may inform, for example, the eNB 402 that access to the secondary band is granted upon certain conditions. This is indicated in FIG. 4, for example, by exchange 418. In exchange 418, the SON server 404 may send information (either directly or indirectly) to the eNB 402 that may include information specifying the secondary band (such as frequency, bandwidth, channel number, or so forth), and one or more conditions of the license (geographic location, type of access, time, and so forth) so that the eNB 402 may determine when conditions of the license have been met and begin using the secondary band.

The secondary band test operation 420 represents the eNB 402 waiting until the conditions of the license are met before beginning to utilize the secondary band. Upon the conditions being met, the eNB 402 may inform the SON server 404 that the secondary band has been activated (illustrated by exchange 422) and begin utilizing the secondary band (illustrated by exchange 426). The SON server 404 may, in turn, inform the OAM 406 that the secondary band has been activated for the eNB 402 (illustrated by exchange 424). The UE 400 that utilize the secondary band may also utilize the primary band as described in conjunction with the UE 300 above.

While utilizing the secondary band, the eNB 402 may monitor the conditions of the license to ensure they remain met and, when they fail to be met, discontinue use of the secondary band. This is illustrated by secondary band test operation 428, which indicates that use of the band is authorized as long as the conditions continue to be met.

Upon invalidation of one or more conditions (depending on how the license is written), the eNB 402 stops using the band as indicated by operation 430. As previously discussed, discontinuing use of the secondary band may involve UE 400 stopping using the secondary band, eNB 402 stopping broadcasting the availability of the secondary band, and other operations. These are all represented by operation 430.

Once the eNB 402 has discontinued use of the secondary band, appropriate notifications may be sent as indicated by exchange 432 and exchange 434.

Although FIG. 4 only represents a single eNB 402, the SON server 404 may delegate to any number of eNB 402 systems and may also, in some embodiments, retain control over other eNB 402 systems (such as in the more centralized embodiment of FIG. 3) creating a "hybrid" embodiment where some eNB 402 have been delegated SON responsibilities and some are directly controlled by the SON server 404.

Figure 5:
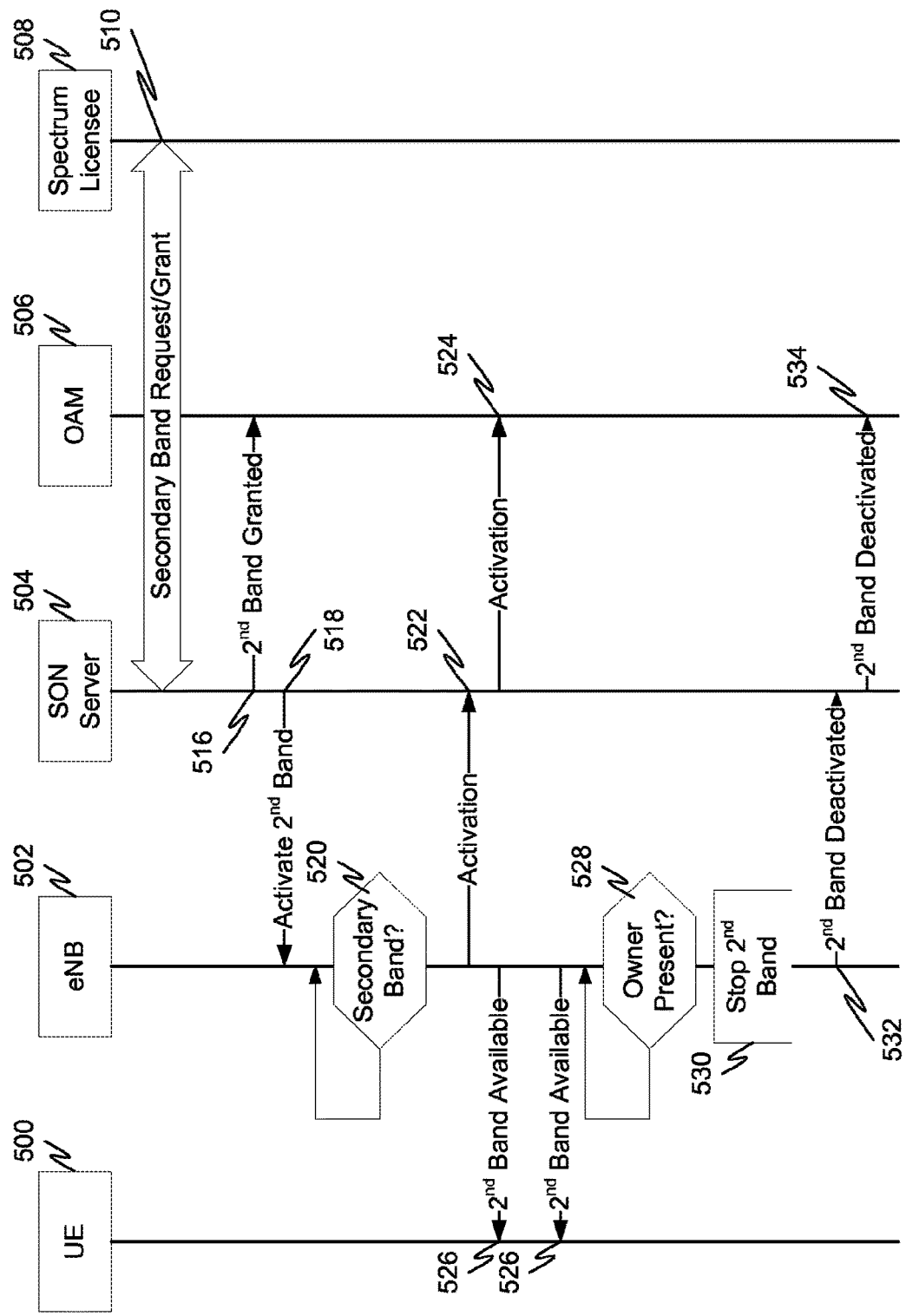
FIG. 5 illustrates an example diagram for spectrum sharing based on a distributed self-organizing network with back off provisions.

FIG. 5 illustrates an example diagram for spectrum sharing based on a distributed self-organizing network with back off provisions. The embodiment of FIG. 5 has several similarities to the embodiment of FIG. 4 and many of the exchanges and operations are similar to those in FIG. 4 and need to be repeated in detail here. Thus, where operations and exchanges are similar, reference will be made to FIG. 4 where details may be obtained.

In FIG. 5, secondary band request/grant process 510 may operate substantially as outlined in conjunction with secondary band request/grant 410 of FIG. 4. As such, it represents the exchanges and processes implemented between the SON server 504, the Operations and Maintenance server (OAM) 506 and spectrum licensee 508 to request and receive access to one or more secondary bands along with their associated licenses.

As in the distributed embodiment of FIG. 4, the SON sever 504 may delegate decision making authority to the eNB 502 to use the secondary band in accordance with the licensing provisions as discussed in conjunction with FIG. 4. Thus, exchange 518 may operate substantially as exchange 418, secondary band test operation 520 may operate substantially as secondary band test operation 420, exchange 522 as exchange 422, exchange 524 as exchange 424 and exchange 526 as exchange 426.

In the embodiment of FIG. 5, one of the license conditions is that operation of the secondary band may only occur when the original spectrum owner is not present. Thus, owner test operation 528 is included in the embodiment of FIG. 5. This test operation illustrates monitoring use of the secondary band by the original spectrum owner. This may include, for example, eNB 502 and/or UE 500 watching for communication on the band that may be attributed to the owner of the band. Detecting the presence of the owner of the secondary band may be accomplished by detecting signals adhering to the original use of the band. Such signals may differ in form and/or content from the signals used by the UE 500 and/or the eNB 502, may be manifested in the form of high level interference, thus allowing UE 500 and/or the eNB 502 to detect their presence. The UE 500 and/or the eNB 502 receiver or transceiver circuitry may be used to detect the presence of the owner of the secondary band in many instances. Alternatively, or additionally, the eNB 502 and/or the UE 500 may use separate receiver and/or transceiver circuitry to detect the presence of the owner of the secondary band.

Upon detecting the presence of the owner of the secondary band, eNB 502 and/or UE 500 may implement a collision avoidance or back off procedure. In one embodiment, this may entail discontinuing use of the band. In such a situation, stop secondary band operation 530 indicates that the eNB 502 will discontinue use of the band, including causing any UE 500 to stop using the secondary band and stopping broadcasting the availability of the secondary band. Notifications of deactivation of the secondary band may be sent as indicated by exchange 532 and exchange 534.

Alternatively, the back off procedure may not include discontinuing use of the band. It may simply use of some sort of collision avoidance scheme such as refraining from transmitting in the band for a period of time, switching channels, or some other collision avoidance procedure. What should happen when the owner of the band is using the band may be specified as part of the license conditions.

Although not specifically illustrated in FIG. 5, the eNB 502 may also be monitoring for adherence to other license conditions such as time, event occurrence, demand, and so forth, through a process similar to that illustrated and discussed in conjunction with secondary band test operation 428 of FIG. 4. When the license conditions are no longer met, the eNB 502 may discontinue use of the secondary band as previously described.

Figure 6:
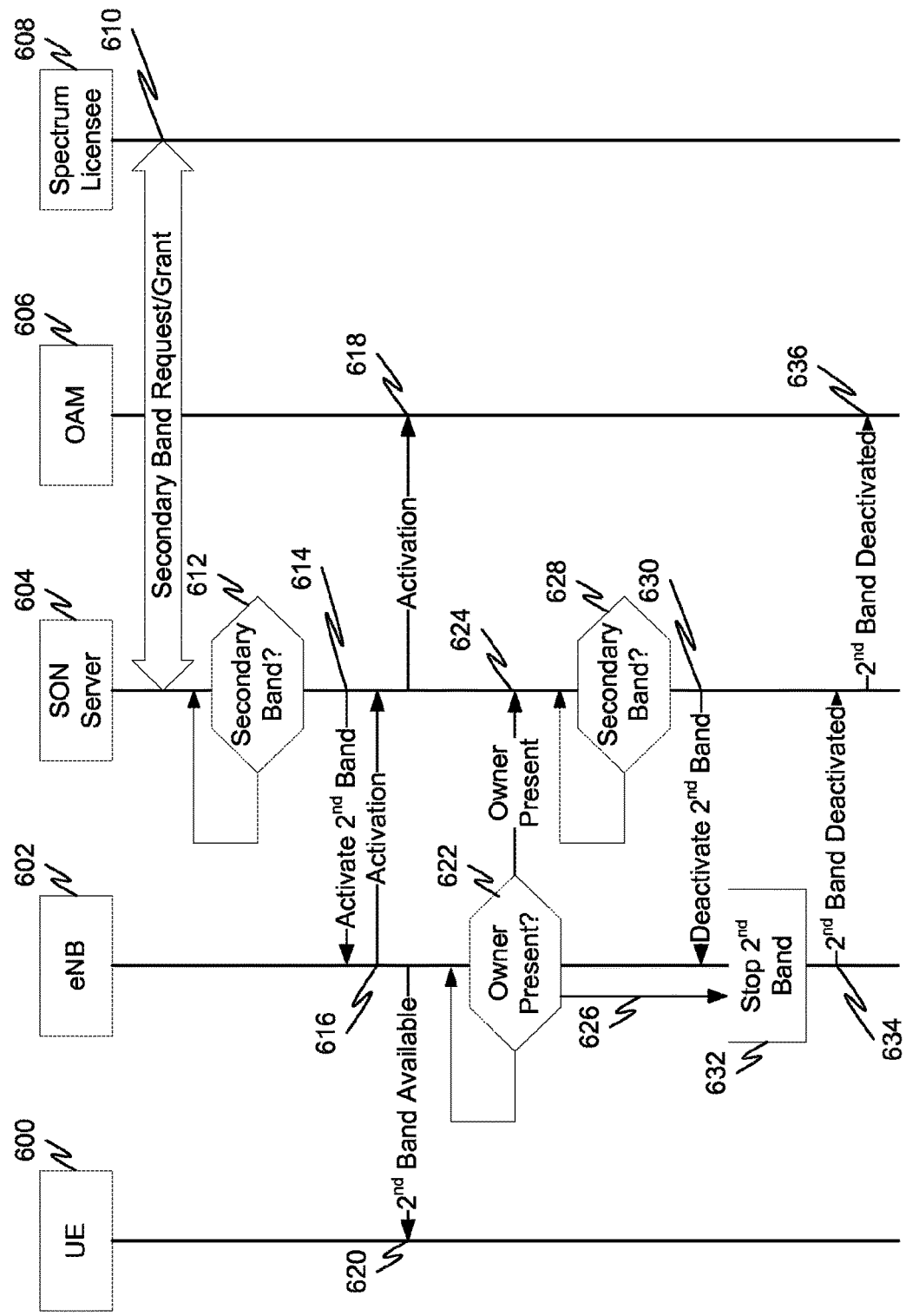
FIG. 6 illustrates an example diagram for spectrum sharing based on a centralized self-organizing network with back off provisions.

In a more centralized control type of embodiment, the SON server 504 typically monitors the license conditions and initiates shutdown of the secondary band when the conditions are no longer met. However, if the SON server 504 does not have appropriate receiver and/or transceiver circuitry, or of the SON server 504 does not operate in a geographic region where such circuitry would allow the SON server 504 to identify operation of the original owner within the secondary band, the SON server 504 may rely on other systems to inform the SON server 504 when the owner of the secondary band is operating within the band. FIG. 6 illustrates an example diagram for spectrum sharing based on a centralized self-organizing network with back off provisions.

In FIG. 6, secondary band request/grant procedure 610 represents the initiation/request/grant processes such as those described in conjunction with FIGS. 3-5 discussed above and the details need not be repeated here. Once the license has been granted and the conditions of the license obtained, the SON server 604 may determine when the license conditions are met as illustrated by secondary band test operation 612.

When the license conditions are met and operation within the secondary band is authorized, the SON server 604 may initiate use of the secondary band as indicated by exchange 614. The eNB 602 may active the secondary band (e.g., exchange 620) and inform the SON server 604 that the secondary band has been activated (e.g., exchange 616). The SON server 604 may, in turn, notify the OAM 606 that the secondary band has been activated (e.g., exchange 618).

Assuming that the SON server 604 is not able to directly monitor the presence of the spectrum owner, and assuming that the eNB 602 and/or UE 600 need to implement some sort of collision avoidance or back off procedure when the spectrum owner is present, the SON server 604 may utilize the functionality of the eNB 602 and/or UE 600 to detect the presence of the spectrum owner. This may occur, for example, by the SON server 604 informing the eNB 602 that the eNB 602 and/or UE 600 should monitor for the presence of the spectrum owner in exchange 614. Use of a separate exchange or some other mechanism could also be employed.

Owner present test operation 622 represents the eNB 602 and/or UE 600 monitoring for the presence of the spectrum owner. As described in conjunction with FIG. 5, this may utilize the receiver and/or transceiver circuitry of the eNB 602 and/or UE 600 or may utilize separate receiver and/or transceiver circuitry. When the eNB 602 and/or UE 600 detects the presence of the spectrum owner, it may inform the SON server 604 as indicated by exchange 624. The SON server 604 may then initiate shutdown of the secondary band or other collision avoidance or back off procedure to the extent that function is not delegated and/or implemented by the eNB 602. Such a situation may occur, for example, when one eNB 602 detects the presence of the spectrum owner, but several eNB 602 should discontinue use of the secondary spectrum in accordance with the license conditions. In that situation, the eNB 602 that detected the presence may not need to be told to discontinue use of the secondary band while the others may need to be told to discontinue use of the secondary band.

If the eNB 602 does not need to be informed to discontinue use of the secondary band, path 626 indicates that the eNB 602 may discontinue use of the secondary band as indicated by operation 632, exchange 634 and exchange 636. If, however, the eNB 602 does need to be informed to discontinue use of the secondary band, or if the SON server 604 determines that the conditions for use of the secondary band are no longer met (e.g., test operation 628), then the SON server 604 may inform the eNB 602 to discontinue use of the band in exchange 630. In response the eNB 602 will discontinue use of the secondary band as indicated by operation 632 and exchange 634 and exchange 636.

The terms of the license may not specify termination of use of the secondary band. Alternatively, the back off procedure may use of some sort of collision avoidance scheme such as refraining from transmitting in the band for a period of time, switching channels, or some other collision avoidance procedure. What should happen when the owner of the band is using the band may be specified as part of the license conditions.

Although in FIGS. 3-6 reference was made to "the secondary band," there may be multiple secondary bands, along with their associated licenses (and conditions). Thus the SON server and/or eNBs illustrated in these figures may be monitoring license conditions for and/or using multiple secondary bands. Thus, one secondary band may be authorized for use under one set of conditions and a second secondary band may be authorized for use under a second set of conditions. Additionally, the SON server illustrated in at least some of these figures may retain control over some secondary bands while delegating control over others, the SON server illustrated in at least some of these figures may retain control over all secondary bands, and/or the SON server illustrated in at least some of these figures may delegate control over all secondary bands.

Figure 7:
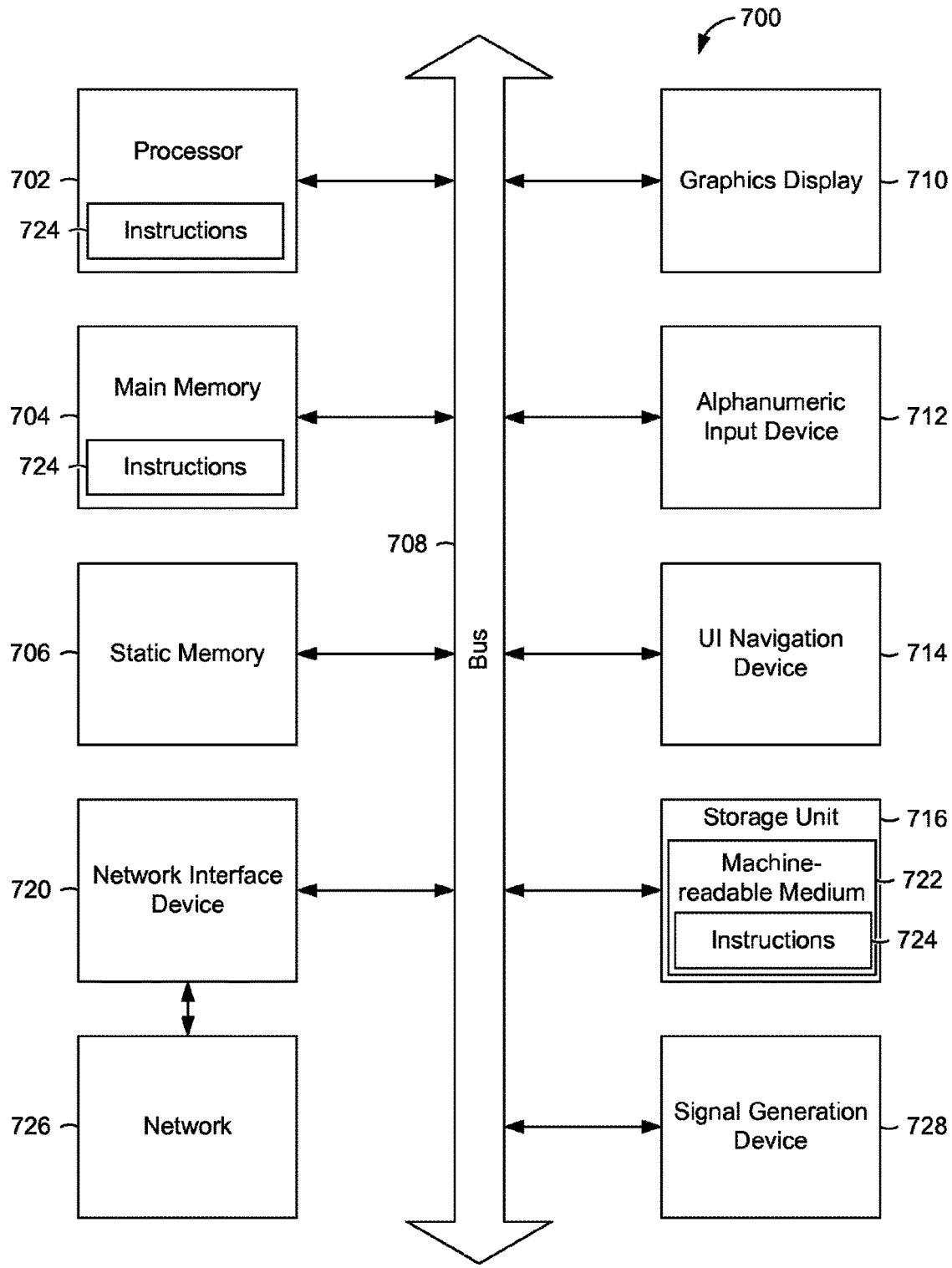
FIG. 7 is a block diagram of a computer processing system, within which a set of instructions for causing the computer to perform methodologies of this disclosure, including functions performed by the Self-Organizing Network (SON) Server, the Operations and Maintenance (OAM) Server, and/or spectrum licensee.

FIG. 7 is a block diagram of a computer processing system 700, within which a set of instructions 724 for causing the computer to perform methodologies of this disclosure, including functions performed by the Self-Organizing Network (SON) server, the Operations and Maintenance (OAM) server, and/or spectrum licensee and/or other servers and systems described in FIGS. 1-7.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

In addition to being sold or licensed via traditional channels, embodiments may also, for example, be deployed by software-as-a-service (SaaS), application service provider (ASP), or utility computing providers. The computer may be a server computer, a personal computer (PC), a tablet PC, a set-top box (STB), a personal digital assistant (PDA), cellular telephone, or any processing device capable of executing a set of instructions 724 (sequential or otherwise) that specify actions to be taken by that device. Further, while only a single computer is illustrated, the term "computer" shall also be taken to include any collection of computers that individually or jointly execute a set (or multiple sets) of instructions 724 to perform any one or more of the methodologies discussed herein, including the functions of the SON servers, the OAM servers, spectrum licensees, and so forth.

The example computer processing system 700 includes a processor 702 (e.g., a central processing unit (CPU), a graphics processing unit (GPU), advanced processing unit (APU) or some combination thereof), a main memory 704 and static memory 706, which may communicate with each other via a bus 708. The computer processing system 700 may further include a graphics display 710 (e.g., a plasma display, a liquid crystal display (LCD) or a cathode ray tube (CRT) or other display). The processing system 700 may also include an alphanumeric input device 712 (e.g., a keyboard), a user interface (UI) navigation device 714 (e.g., a mouse, touch screen, or the like), a storage unit 716, a signal generation device 728 (e.g., a speaker), and/or a network interface device 720.

The storage unit 716 includes a machine-readable medium 722 on which is stored one or more sets of data structures and instructions 724 (e.g., software) embodying or utilized by any one or more of the methodologies or functions described herein such as the functions associated with the SON servers, the OAM servers, the spectrum licensees, and so forth. The instructions 724 may also reside, completely or at least partially, within the main memory 704 and/or within the processor 702 during execution thereof by the computer processing system 700, with the main memory 704 and the processor 702 also constituting computer-readable, tangible media.

The instructions 724 may be transmitted or received over a network 726 via a network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" may be taken to include a single medium or multiple media (e.g., a centralized or distributed database, and/or associated caches and servers) that store the one or more sets of instructions 724.

Plural instances may be provided for components, modules, operations, or structures described herein as a single instance. Finally, boundaries between various components, modules, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure, module, or component. Similarly, structures and functionality presented as a single module or component may be implemented as separate modules or components. These and other variations, modifications, additions, and improvements fall within the scope of the claims and their equivalents.

It will be appreciated that, for clarity purposes, the above description describes some embodiments with reference to different functional units or processors. However, it will be apparent that any suitable distribution of functionality between different functional units, processors or domains may be used without detracting from the embodiments of the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 8:
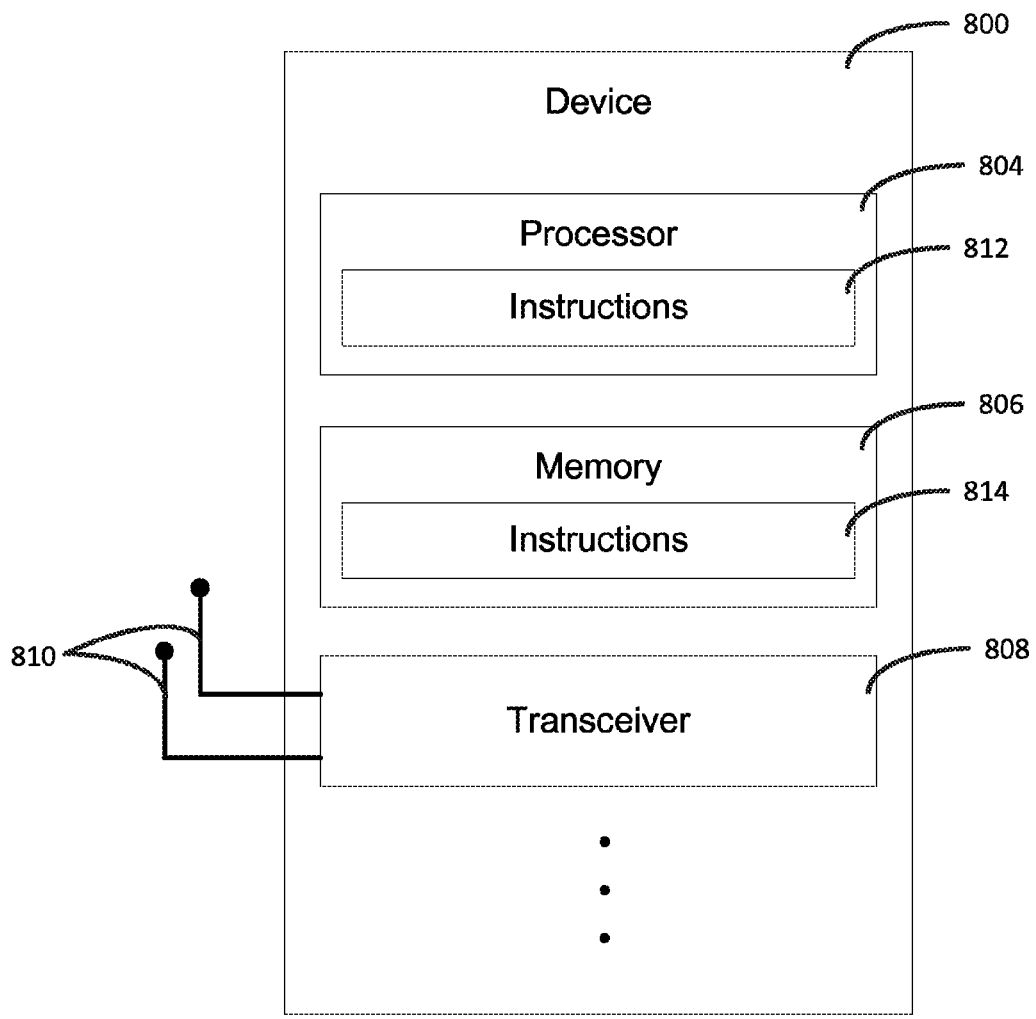
FIG. 8 illustrates a system block diagram of a wireless device, according to some embodiments.

FIG. 8 illustrates a block diagram of a device 800 that may represent any of the wireless devices discussed herein and may implement any of the flow diagrams or processing discussed herein. Thus, FIG. 8 may represent, for example, the eNBs of FIGS. 1-6 and/or UEs of FIGS. 1-6.

The device 800 may include a processor 804, a memory 806, a transceiver 808, antennas 810, instructions 812, 814, and possibly other components (not shown).

The processor 804 comprises one or more central processing units (CPUs), graphics processing units (GPUs), accelerated processing units (APUs), signal processors, or various combinations thereof. The processor 804 provides processing and control functionalities for the device 800 and may implement the flow diagrams and logic described above for the eNBs and UEs of FIGS. 1-6.

The memory 806 comprises one or more transient and/or static memory units configured to store instructions 812, 814 and data for the device 800. The transceiver 808 comprises one or more transceivers including, for an appropriate station or responder, a multiple-input and multiple-output (MIMO) antenna to support MIMO communications. For the device 800, the transceiver 808 receives transmissions and transmits transmissions. The transceiver 808 may be coupled to the antennas 810, which represent an antenna or multiple antennas, as appropriate to the device 800. As described in the figures above, the UE and eNB may operate in the primary band and the secondary bands and may be adapted to tune to any secondary band to which license is granted.

The instructions 812, 814 comprise one or more sets of instructions or firmware/software executed on a computing device (or machine) to cause such a computing device (or machine) to perform any of the methodologies discussed herein. The instructions 812, 814 (also referred to as computer- or machine-executable instructions) may reside, completely or at least partially, within the processor 804 and/or the memory 806 during execution thereof by the device 800. While the instructions 812 and 814 are illustrated as separate, they can be part of the same whole. The processor 804 and the memory 806 also comprise machine-readable storage media. The instructions 812 and 814 may implement, for example, all or part of the flow diagrams in FIGS. 3-6 attributed to the eNB and/or UE. Additionally, or alternatively, the instructions 812 and 814 may implement other processing and functionality discussed in conjunction with the other embodiments above such as FIG. 1 and FIG. 2.

In FIG. 8, processing and control functionalities are illustrated as being provided by the processor 804 along with the associated instructions 812 and 814. However, these are only examples of processing circuitry that comprise programmable logic or circuitry (e.g., as encompassed within a general-purpose processor 804 or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement processing circuitry mechanically, in dedicated and permanently configured circuitry, or in temporarily configured circuitry (e.g., configured by software) may be driven by cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The term "computer readable medium," "machine-readable medium" and the like should be taken to include a single medium or multiple media (e.g., a centralized or distributed database, and/or associated caches and servers) that store the one or more sets of instructions (e.g., 724, 812, 814). The terms shall also be taken to include any medium that is capable of storing, encoding or carrying a set of instructions (e.g., 724 812, 814) for execution by the machine and that cause the machine to perform any one or more of the methodologies of the present disclosure. The term "computer readable medium," "machine-readable medium" and the like shall accordingly be taken to include both "computer storage medium," "machine storage medium" and the like as well as "computer communication medium," "machine communication medium" and the like. The terms "computer storage medium," "machine storage medium" and the like shall be taken to include physically tangible sources including solid-state memories, optical and magnetic media, or other tangible devices and carriers. These terms specifically exclude signals per se, carrier waves and other such physically intangible sources. The terms "computer communication medium," "machine communication medium" and the like shall be taken to include the physically intangible sources including, signals per se, carrier wave signals and the like that are specifically excluded by the terms "computer storage medium," "machine storage medium" and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

Although the present embodiments have been described in connection with some embodiments, it is not intended to be limited to the specific form set forth herein. One skilled in the art would recognize that various features of the described embodiments may be combined in accordance with the disclosure. Moreover, it will be appreciated that various modifications and alterations may be made by those skilled in the art without departing from the scope of the disclosure.

The following represent various example embodiments.

EXAMPLE 1

A method performed by an enhanced Node B (eNB) comprising:
receiving, from a control server, an indication that a secondary band may be used to communicate with user equipment (UE);
transmit, to the control server, an acknowledgment that the secondary band has been activated;
begin broadcasting availability of the secondary band to UE;
receive, from the control server, an indication that use of the secondary band should be discontinued;
discontinuing use of the secondary band; and
transmitting an acknowledgment that use of the secondary band has been discontinued.

EXAMPLE 2

The method of example 1, wherein the control server is a self-organizing network server.

EXAMPLE 3

The method of example 1, wherein the control server is a domain manager.

EXAMPLE 4

A method performed by an enhanced Node B (eNB) comprising:
receiving, from a control server, a control message containing a condition under which a secondary band may be used to communicate with user equipment (UE);
determining that the condition under which a secondary band may be used have been met;
based on determining the condition has been met, begin broadcasting availability of the secondary band to UE;
determining that the condition under which the secondary band may be used are no longer met;
based on determining the condition is no longer met, discontinuing use of the secondary band.

EXAMPLE 5

The method of example 4, wherein the control message indicates that the eNB should immediately begin using the secondary band.

EXAMPLE 6

The method of example 5, further comprising receiving, from the control server, a message to discontinue using the secondary band and wherein determining the conditions under which the secondary band may be used comprise receipt of the message to discontinue using the secondary band.

EXAMPLE 7

The method of example 4, wherein the condition under which the secondary band may be used comprises at least one of:
a geographic region where the secondary band may be used;
a geographic region where the secondary band may not be used;
a time at which the secondary band may be used;
a time at which the secondary band may not be used;
at least one event that indicates the secondary band may be used;
at least one event that indicates the secondary band may not be used;
a demand threshold above which the secondary band may be used;

a demand threshold below which the secondary band may not be used;
presence of the spectrum owner;
absence of the spectrum owner; and
combinations thereof.

EXAMPLE 8

The method of example 4 or 7 further comprising sending a message to the control server indicating the secondary band has been activated upon determining that the condition has been met.

EXAMPLE 9

The method of example 4 or 7 further comprising sending a message to the control server indicating the secondary band has been deactivated upon determining that the condition has no longer been met.

EXAMPLE 10

The method of example 4, 5, 6 or 7 further comprising:
determining an owner of the secondary band is operating in the secondary band; and
based upon determining the owner is operating in the secondary band, implementing a back off procedure.

EXAMPLE 11

The method of example 10 wherein the back off procedure comprises:
discontinuing use of the secondary band; and
sending a message to the control server that the owner is operating in the secondary band.

EXAMPLE 12

The method of example 10 wherein the back off procedure comprises:
discontinuing use of the secondary band for a period of time; and
determining whether the owner is still operating in the secondary band.

EXAMPLE 13

The method of example 12 wherein the back off procedure further comprises sending a message to the control server that the owner is operating in the secondary band.

EXAMPLE 14

A method performed by an enhanced Node B (eNB) comprising:
obtaining containing a condition under which a secondary band may be used to communicate with user equipment (UE);
determining that the condition under which a secondary band may be used has been met;
based on determining the condition has been met, begin broadcasting availability of the secondary band to UE;
determining that the condition under which the secondary band may be used is no longer met;
based on determining the condition is no longer met, discontinuing use of the secondary band.

EXAMPLE 15

The method of example 14, wherein the condition under which the secondary band may be used comprises at least one of:
a geographic region where the secondary band may be used;
a geographic region where the secondary band may not be used;
a time at which the secondary band may be used;
a time at which the secondary band may not be used;
at least one event that indicates the secondary band may be used;
at least one event that indicates the secondary band may not be used;
a demand threshold above which the secondary band may be used;
a demand threshold below which the secondary band may not be used;
presence of the spectrum owner;
absence of the spectrum owner; and
combinations thereof.

EXAMPLE 16

The method of example 14 or 15 further comprising sending a message to a control server indicating the secondary band has been activated upon determining that the conditions have been met.

EXAMPLE 17

The method of example 14 or 15 further comprising sending a message to a control server indicating the secondary band has been deactivated upon determining that the conditions have no longer been met.

EXAMPLE 18

The method of example 14 or 15 further comprising:
determining an owner of the secondary band is operating in the secondary band; and
based upon determining the owner is operating in the secondary band, implementing a back off procedure.

EXAMPLE 19

The method of example 18 wherein the back off procedure comprises:
discontinuing use of the secondary band; and
sending a message to a control server that the owner is operating in the secondary band.

EXAMPLE 20

The method of example 18 wherein the back off procedure comprises:
discontinuing use of the secondary band for a period of time; and
determining whether the owner is still operating in the secondary band.

EXAMPLE 21

The method of example 20 wherein the back off procedure further comprises sending a message to a control server that the owner is operating in the secondary band.

EXAMPLE 22

A wireless device comprising:
at least one antenna;
transceiver circuitry coupled to the at least one antenna;
memory;
a processor coupled to the memory and transceiver circuitry; and
instructions, stored in the memory, which when executed cause the processor to:
receive, via the at least one antenna and transceiver circuitry, a control message containing a condition under which a secondary band may be used to communicate with user equipment (UE);
determine that the condition under which a secondary band may be used has been met;
based on determining the condition has been met, broadcast availability of the secondary band to UE;
determine that the condition under which the secondary band may be used is no longer met;
based on determining the condition is no longer met, discontinue use of the secondary band.

EXAMPLE 23

The device of example 22, wherein the instructions further cause the processor to send, via the at least one antenna and control circuitry, a message indicating that the secondary band has been activated upon determining that the conditions have been met.

EXAMPLE 24

The device of example 22, wherein the instructions further cause the processor to send, via the at least one antenna and control circuitry, a message indicating that the secondary band has been deactivated upon determining that the conditions are no longer met.

EXAMPLE 25

The device of example 22, wherein the condition under which the secondary band may be used comprises at least one of:
a geographic region where the secondary band may be used;
a geographic region where the secondary band may not be used;
a time at which the secondary band may be used;
a time at which the secondary band may not be used;
at least one event that indicates the secondary band may be used;
at least one event that indicates the secondary band may not be used;
a demand threshold above which the secondary band may be used;
a demand threshold below which the secondary band may not be used;
presence of the spectrum owner;
absence of the spectrum owner; and
combinations thereof.

EXAMPLE 26

The device of examples 22, 23, 24 or 25 wherein the instructions further cause the processor to:
determine an owner of the secondary band is operating in the secondary band; and
based upon determining the owner is operating in the secondary band, implement a back off procedure.

EXAMPLE 27

The device of example 26 wherein the back off procedure comprises:
discontinuing use of the secondary band; and
sending a message to a control server that the owner is operating in the secondary band.

EXAMPLE 28

The device of example 26 wherein the back off procedure comprises:
discontinuing use of the secondary band for a period of time; and
determining whether the owner is still operating in the secondary band.

EXAMPLE 29

The device of example 28 wherein the back off procedure further comprises sending a message to a control server that the owner is operating in the secondary band.

EXAMPLE 30

A self-organizing network device comprising:
processing circuitry configured to:
obtain authorization to use a secondary band, the authorization containing a condition under which the secondary band may be used;
identify when the condition has been met;
send a message to an enhanced node B (eNB) to begin using the secondary band;
identify when the condition is no longer met;
send a message to the eNB to discontinue using the secondary band.

EXAMPLE 31

The device of example 30, wherein the processing circuitry is further configured to notify an operations and maintenance server that authorization to use the secondary band has been obtained.

EXAMPLE 32

The device of example 30 or 31, wherein the condition under which the secondary band may be used comprises at least one of:
a geographic region where the secondary band may be used;
a geographic region where the secondary band may not be used;
a time at which the secondary band may be used;
a time at which the secondary band may not be used;
at least one event that indicates the secondary band may be used;
at least one event that indicates the secondary band may not be used;
a demand threshold above which the secondary band may be used;

a demand threshold below which the secondary band may not be used;
presence of the spectrum owner;
absence of the spectrum owner; and
combinations thereof.

EXAMPLE 33

A computer storage medium having executable instructions embodied thereon that, when executed, configure a device to:
identify a condition under which a secondary band may be used by user equipment (UE);
determine the condition under which the secondary band may be used has been met;
based on determining the condition has been met, initiating activation of the secondary band to communicate with UE;
determine the condition under which the secondary band may be used is no longer met; and
based on determining the condition is no longer met, initiating deactivation of the secondary band to communicate with UE.

EXAMPLE 34

The computer storage medium of example 33, wherein the computer storage medium is used by an enhanced Node B (eNB).

EXAMPLE 35

The computer storage medium of example 33, wherein the computer storage medium is used by a self-organizing network device.

EXAMPLE 36

The computer storage medium of example 33, 34 or 35, the condition under which the secondary band may be used comprises at least one of:
a geographic region where the secondary band may be used;
a geographic region where the secondary band may not be used;
a time at which the secondary band may be used:
a time at which the secondary band may not be used;
at least one event that indicates the secondary band may be used:
at least one event that indicates the secondary band may not be used;
a demand threshold above which the secondary band may be used;
a demand threshold below which the secondary band may not be used;
presence of the spectrum owner;
absence of the spectrum owner; and
combinations thereof.

EXAMPLE 37

The computer storage medium of example 36, wherein executable instructions further configure the device to receive the condition via a message.

EXAMPLE 38

User Equipment comprising:
at least one antenna;
transceiver circuitry coupled to the at least one antenna;
memory;
a processor coupled to the memory and transceiver circuitry; and
instructions, stored in the memory, which when executed cause the processor to:
receive, via the at least one antenna and transceiver circuitry, a control message from an enhanced Node B (eNB) on a primary band indicating that a secondary band is available for use;
begin using the secondary band for communications;
receive, via the at least one antenna and transceiver circuitry, a control message from the eNB that the secondary band should no longer be used; and
discontinue use of the secondary band for communications.

EXAMPLE 39

The UE of example 38 wherein the instructions further cause the processor to use the primary band for control messages sent from and received by the UE.

What is claimed is:
1. An apparatus of a shared spectrum network entity, the shared spectrum network entity configured to operate in a 3GPP network and support access to a shared spectrum, the apparatus comprising one or more processors configured to:
encode a notification message, for transmission to a licensee entity, the notification message including information associated with resource availability in the shared spectrum, the information including one or more indications of conditions for use of the shared spectrum, wherein the indications indicate a geographic area, a frequency range, and a time associated with the use of the shared spectrum;
decode a response, from signaling received from the licensee entity, the response acknowledging the conditions for use of the shared spectrum;
encode a message for transmission to an enhanced node B (eNB) to inform the eNB that access to the shared spectrum has been granted and the conditions for use of the shared spectrum;
decode signalling received from the eNB indicating that the conditions for use of the shared spectrum are met and that the shared spectrum is activated;
decode signalling received from the eNB indicating that that one or more of the conditions for use of the shared spectrum are no longer met and that the shared spectrum is deactivated, wherein a detection of incumbent usage by the eNB triggers deactivation of the shared spectrum; and
memory configured to store at least the information associated with the resource availability in the shared spectrum.

2. The apparatus of claim 1, wherein the one or more processors are to configure the apparatus to communicate with a network manager, wherein the network manager is configured to initiate at least one operation of managing access to the shared spectrum.

3. The apparatus of claim 2, wherein the network manager is configured to:
encode a request message, for transmission to the licensee entity, the request message indicating the information associated with the resource availability in the shared spectrum; and
decode a response to the request message, from signaling received from the licensee entity.

4. The apparatus of claim 1, wherein the one or more processors are to configure the apparatus to support entry and storage of information describing a usage of the shared spectrum, and to support entry and storage of the information associated with the resource availability in the shared spectrum.

5. The apparatus of claim 1, wherein the one or more processors are to configure the apparatus to convey, to the licensee entity, the information associated with the resource availability in the shared spectrum, and to receive acknowledgement information from the licensee entity, and store, the acknowledgement information.

6. The apparatus of claim 1, wherein the one or more processors are configured to configure the apparatus to ensure that the shared spectrum network operates in conformance with the conditions for use of the shared spectrum.

7. The apparatus of claim 1, wherein the notification message for transmission to the licensee entity is to request access to the frequency range indicated in the information associated with the resource availability in the shared spectrum.

8. The apparatus of claim 1, wherein the response from the signaling received from the licensee entity is to receive access to the frequency range indicated in the information associated with the resource availability in the shared spectrum.

9. The apparatus of claim 1, wherein the response further includes an option of resource availability in the shared spectrum, the option including at least one further condition for use of the shared spectrum.

10. The apparatus of claim 9, wherein the one or more processors are configured to select the option of resource availability in the shared spectrum according to a preference rule.

11. A computer-readable hardware storage device that stores instructions for execution by one or more processors of a network manager, the instructions to configure the one or more processors to:
    encode a notification message, for transmission to a licensee entity, the notification message including information associated with resource availability in the shared spectrum, the information including one or more indications of conditions for use of the shared spectrum, wherein the indications indicate a geographic area, a frequency range, and a time associated with the use of the shared spectrum;
    decode a response, from signaling received from the licensee entity, the response acknowledging the conditions for use of the shared spectrum;
    encode a message for transmission to an enhanced node B (eNB) to inform the eNB that access to the shared spectrum has been granted and the conditions for use of the shared spectrum;
    decode signalling received from the eNB indicating that the conditions for use of the shared spectrum are met and that the shared spectrum is activated; and
    decode signalling received from the eNB indicating that that one or more of the conditions for use of the shared spectrum are no longer met and that the shared spectrum is deactivated, wherein a detection of incumbent usage by the eNB triggers deactivation of the shared spectrum.

12. The computer-readable hardware storage device of claim 11, wherein the instructions are to configure the one or more processors to communicate with the network manager, wherein the network manager is configured to initiate at least one operation of managing access to the shared spectrum.

13. The computer-readable hardware storage device of claim 12, wherein the network manager is configured to:
    encode a request message, for transmission to the licensee entity, the request message indicating the information associated with the resource availability in the shared spectrum; and
    decode a response to the request message, from signaling received from the licensee entity.

14. The computer-readable hardware storage device of claim 11, wherein the instructions are to configure the one or more processors to support entry and storage of information describing a usage of the shared spectrum, and to support entry and storage of the information associated with the resource availability in the shared spectrum.

15. The computer-readable hardware storage device of claim 11, wherein the instructions are to configure the one or more processors to convey, to the licensee entity, the information associated with the resource availability in the shared spectrum, and to receive acknowledgement information from the licensee entity, and store, the acknowledgement information.

16. The computer-readable hardware storage device of claim 11, wherein the instructions are to configure the one or more processors to ensure that the shared spectrum network operates in conformance with the conditions for use of the shared spectrum.

17. The computer-readable hardware storage device of claim 11, wherein the notification message for transmission to the licensee entity is to request access to the frequency range indicated in the information associated with the resource availability in the shared spectrum.

18. The computer-readable hardware storage device of claim 11, wherein the response from the signaling received from the licensee entity is to receive access to the frequency range indicated in the information associated with the resource availability in the shared spectrum.

19. The computer-readable hardware storage device of claim 11, wherein the response further includes an option of resource availability in the shared spectrum, the option including at least one further condition for use of the shared spectrum.

20. The computer-readable hardware storage device of claim 11, wherein the instructions are to configure the one or more processors to select the option of resource availability in the shared spectrum according to a preference rule.

* * * * *